(12) United States Patent
Igarashi

(10) Patent No.: US 12,141,486 B2
(45) Date of Patent: Nov. 12, 2024

(54) PRINT CONTROL APPARATUS, CONTROL METHOD FOR PRINT CONTROL APPARATUS, AND PRINT CONTROL SYSTEM

(71) Applicant: CANON KABUSHIKI KAISHA, Tokyo (JP)

(72) Inventor: Hiroya Igarashi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/329,426

(22) Filed: Jun. 5, 2023

(65) Prior Publication Data
US 2023/0401018 A1     Dec. 14, 2023

(30) Foreign Application Priority Data

Jun. 9, 2022     (JP) .................................. 2022-093564

(51) Int. Cl.
*G06F 3/12*     (2006.01)
(52) U.S. Cl.
CPC .......... *G06F 3/1229* (2013.01); *G06F 3/1203* (2013.01); *G06F 3/1286* (2013.01)
(58) Field of Classification Search
CPC ..... G06F 3/1286; G06F 3/1203; G06F 3/1229
See application file for complete search history.

(56) References Cited

U.S. PATENT DOCUMENTS

| 9,383,953 | B2 * | 7/2016 | Kikuchi | ................ G06F 3/1285 |
| 9,760,320 | B2 * | 9/2017 | Ooba | ................. H04N 1/00928 |
| 2009/0276643 | A1 * | 11/2009 | Saito | ......................... G06F 1/30 |
| | | | | 713/300 |

FOREIGN PATENT DOCUMENTS

| JP | 2019162878 A | 9/2019 |
| JP | 2019200514 A | 11/2019 |

* cited by examiner

*Primary Examiner* — John R Wallace
(74) *Attorney, Agent, or Firm* — Canon U.S.A., Inc. IP Division

(57) ABSTRACT

A print control apparatus communicable with an image forming apparatus and configured to be activated based on activation of the image forming apparatus includes one or more computer-readable storage media, and one or more processors, wherein the one or more processors and the one or more computer-readable storage media are configured to receive a shut-down instruction, receive a signal from the image forming apparatus, transmit a shut-down notification to the image forming apparatus, and receive a reply to the shut-down notification from the image forming apparatus, and perform, in a case where the shut-down instruction is received, shut-down processing of the print control apparatus upon receiving, as the signal, a predetermined signal from the image forming apparatus and receiving the reply to the shut-down notification.

21 Claims, 11 Drawing Sheets

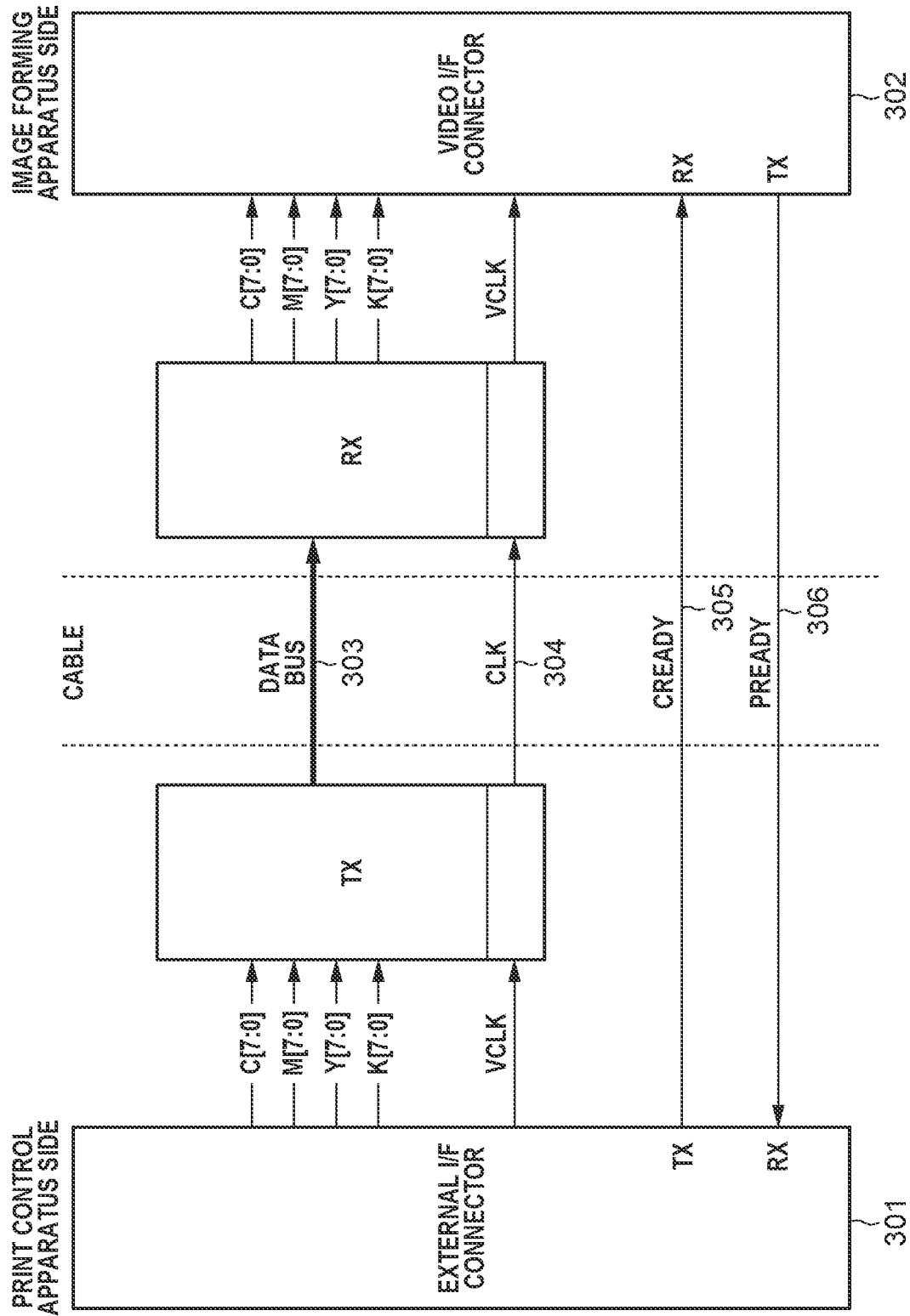

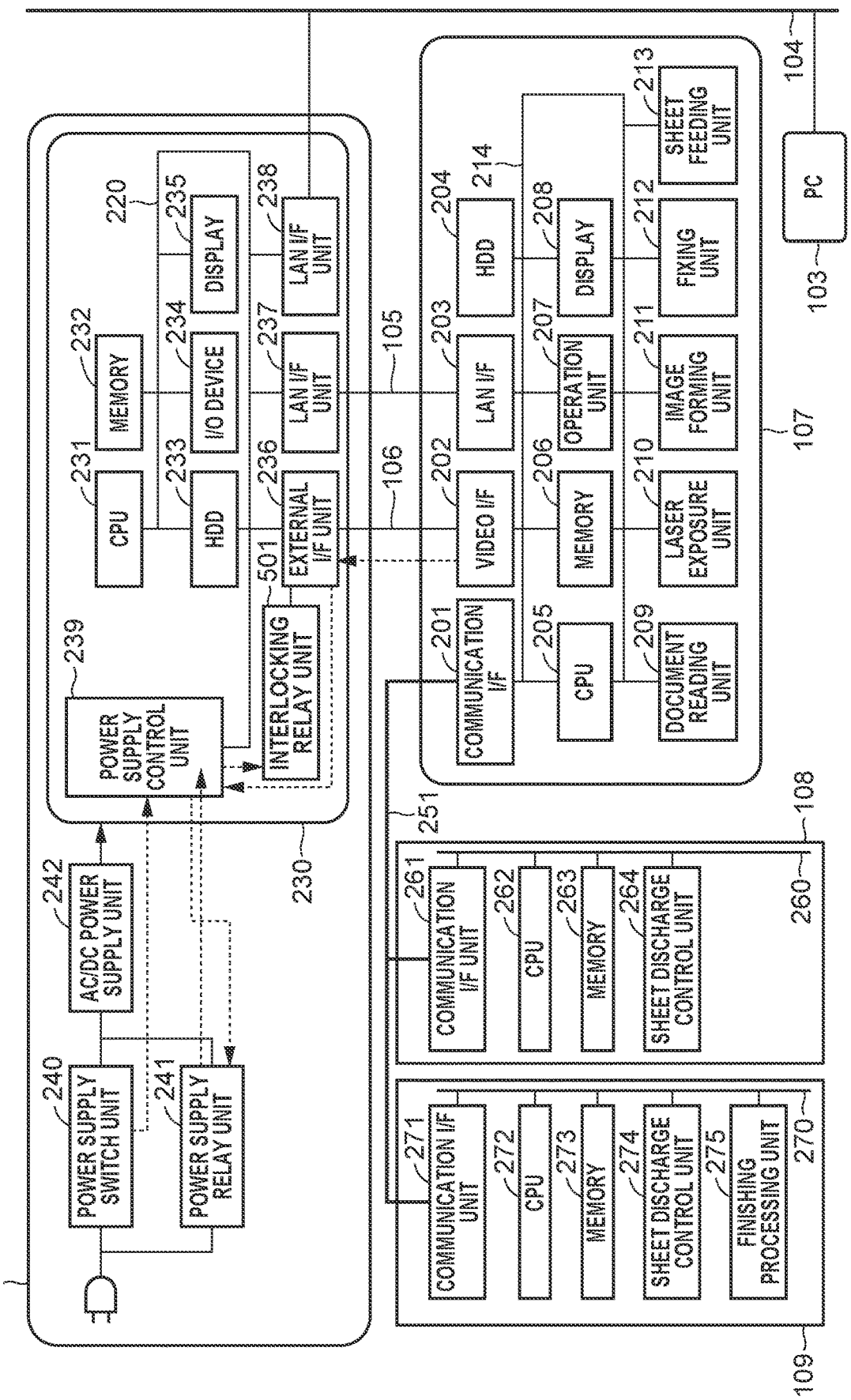

PRINT CONTROL APPARATUS, CONTROL METHOD FOR PRINT CONTROL APPARATUS, AND PRINT CONTROL SYSTEM

BACKGROUND

Field of the Disclosure

The present disclosure relates to a print control apparatus, a control method for the print control apparatus, and a print control system.

Description of the Related Art

In a configuration including an image forming apparatus and a print control apparatus, there is a technique to improve a user's convenience by turning on power of the print control apparatus when the image forming apparatus is powered on. This technique is implemented by a configuration that uses a video cable different from a network cable to transmit a signal indicating that the image forming apparatus is powered on/off to the print control apparatus, and causes the print control apparatus to be powered on in response to the received signal indicating the powered-on state of the image forming apparatus (see, for example, Japanese Patent Application Laid-open No. 2019-200514).

Further, there is a technique of powering off a print control apparatus by using a network cable. Examples of the technique includes a technique of, in a case where an image forming apparatus and a print control apparatus are remotely powered off, preventing the print control apparatus from powering off before the image forming apparatus, and preventing the image forming apparatus from losing the communication partner (see, for example, Japanese Patent Application Laid-open No. 2019-162878).

SUMMARY

According to an aspect of the present disclosure, a print control apparatus communicable with an image forming apparatus and configured to be activated based on activation of the image forming apparatus includes one or more computer-readable storage media, and one or more processors, wherein the one or more processors and the one or more computer-readable storage media are configured to receive a shut-down instruction, receive a signal from the image forming apparatus, transmit a shut-down notification to the image forming apparatus, and receive a reply to the shut-down notification from the image forming apparatus, and perform, in a case where the shut-down instruction is received, shut-down processing of the print control apparatus upon receiving, as the signal, a predetermined signal from the image forming apparatus and receiving the reply to the shut-down notification.

Further features of various embodiments will become apparent from the following description of exemplary embodiments with reference to the attached drawings.

BRIEF DESCRIPTION OF THE DRAWINGS

FIG. 3 is a schematic diagram illustrating communication between the image forming apparatus and the print control apparatus via a video cable according to the first exemplary embodiment.

FIG. 5 is a hardware block diagram illustrating configurations of an image forming apparatus and a print control apparatus according to a second exemplary embodiment.

DESCRIPTION OF THE EMBODIMENTS

Exemplary embodiments will be described in detail with reference to the attached drawings. Note that the following exemplary embodiments are not intended to limit every embodiment according to the scope of the claims, and not all of the combinations of the features described in the following exemplary embodiments are necessarily essential. In the exemplary embodiments, a description will be given of an image processing apparatus as an example of an information processing apparatus. However, it is not limited thereto.

System Configuration

Figure 1:
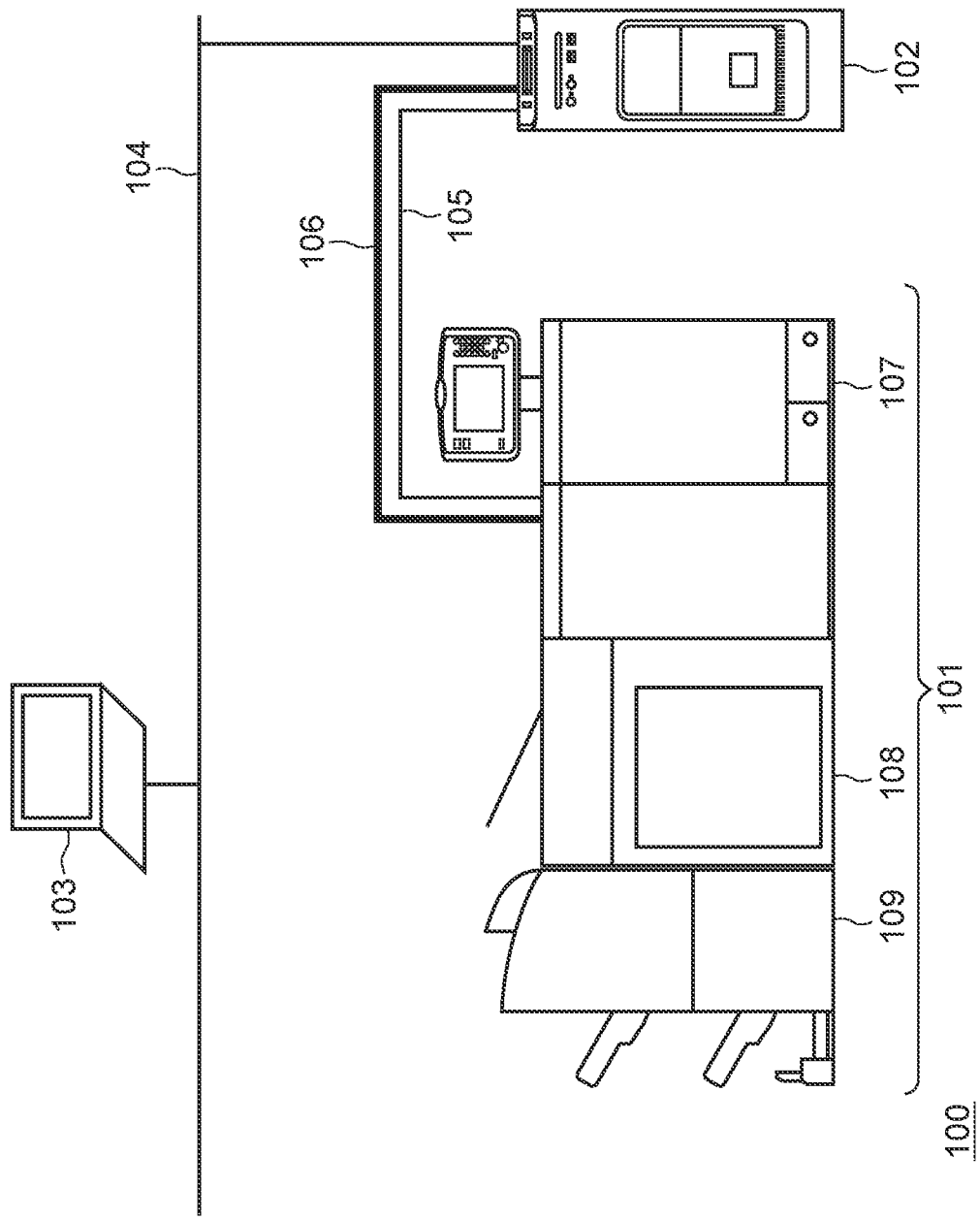
FIG. 1 is a diagram illustrating a configuration of a print control system according to a first exemplary embodiment.

FIG. 1 is a diagram illustrating an example of a print control system according to a first exemplary embodiment. A print control system 100 includes an image forming apparatus 101 and a print control apparatus 102. The image forming apparatus 101 and the print control apparatus 102 are communicably connected via an internal local area network (LAN) 105 and a video cable 106. Specifically, the internal LAN 105 is connected by a LAN cable, such as an Ethernet cable. The video cable 106 is a cable for transmitting print data and a signal indicating a power supply status of the image forming apparatus 101, and details of a configuration of the cable will be described below. Further, the print control apparatus 102 is communicably connected with a personal computer (PC) 103 via an external LAN 104.

A printer driver having a function of converting image data, which is to be a print processing target, into page-description language (PDL) processable by the print control apparatus 102 is installed in the PC 103. A user who desires to perform printing can give a printing instruction from various applications via the printer driver.

Next, the image forming apparatus 101 will be described. The image forming apparatus 101 includes a print module 107, a stacker 108, and a finisher 109. Hereinbelow, each module will be described.

Figure 2:
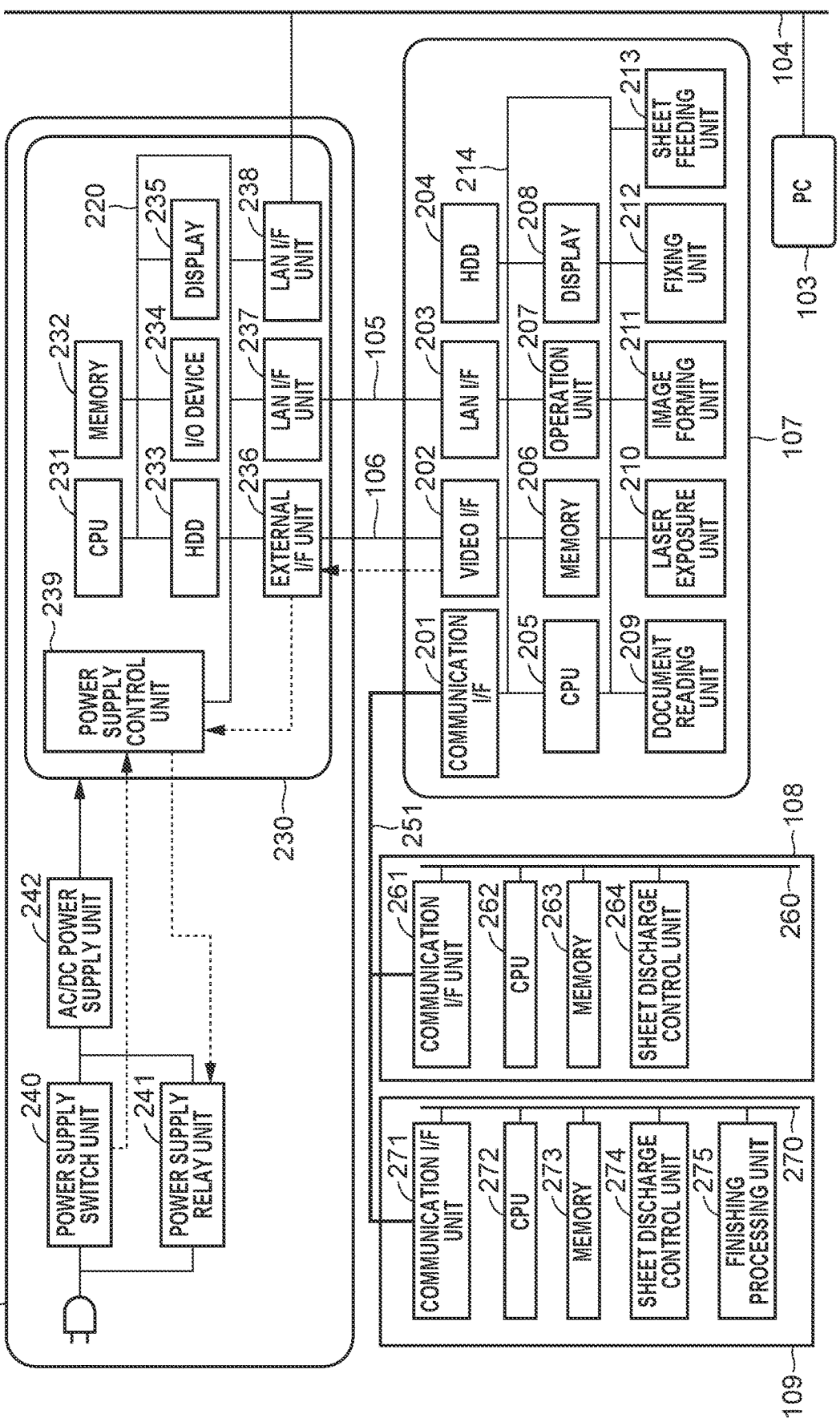
FIG. 2 is a hardware block diagram illustrating configurations of an image forming apparatus and a print control apparatus according to the first exemplary embodiment.

FIG. 2 is a hardware block diagram illustrating configurations of the image forming apparatus 101 and the print control apparatus 102.

Internal Configuration of Image Forming Apparatus

First, the internal configuration of the print module 107 of the image forming apparatus 101 will be described. The print module 107 includes, as components mainly relating to control, a communication interface (I/F) 201, a LAN OF 203, a video OF 202, a hard disk drive (HDD) 204, a central processing unit (CPU) 205, a memory 206, an operation unit 207, and a display 208. Further, the print module 107 includes, as components mainly relating to image forming, a document reading unit 209, a laser exposure unit 210, an image forming unit 211, a fixing unit 212, and a sheet feeding unit 213. The components are connected with each other via a system bus 214. The communication OF 201 is connected to the stacker 108 and the finisher 109 via a communication cable 251 to perform communication to control the stacker 108 and the finisher 109.

The LAN OF 203 is connected to the print control apparatus 102 via the internal LAN 105, to communicate print data and the like. The video I/F 202 is connected to the print control apparatus 102 via the video cable 106, to communicate image data, a signal corresponding to the power supply status of the image forming apparatus 101, and a signal corresponding to a power supply status of the print control apparatus 102. Details thereof will be described below.

The HDD 204 is a storage device storing programs and data. The CPU 205 integrally controls the print module 107 based on a program and the like stored in the HDD 204. The memory 206 stores image data and programs for the CPU 205 to perform various kinds of processing, and the memory 206 operates as a work area. The operation unit 207 receives various setting inputs and operation instructions from a user. The display 208 displays various kinds of setting information regarding print processing and a processing status of a print job. The document reading unit 209 is a scanner device for optically reading a document when a copy function or a scanning function is used.

The document reading unit 209 generates image data by capturing an image on a document placed by a user with a charge-coupled device (CCD) camera while irradiating the document with light from an exposure lamp to optically read the image on the document. The laser exposure unit 210 is a device for performing primary charging in preparation for irradiation with a laser beam, and a laser exposure. First, the laser exposure unit 210 performs the primary charging for negatively charging the surface of a photosensitive drum evenly. Next, a laser beam is radiated by a laser driver onto the photosensitive drum while a reflection angle of the laser beam is being adjusted by a polygonal mirror.

In this way, negative charges on a part of the photosensitive drum irradiated with the laser beam are neutralized, and an electrostatic latent image is formed. The image forming unit 211 is a device for transferring a toner image onto a sheet. The image forming unit 211 includes a developing unit, a transfer unit, and a toner supply unit, which are not illustrated, and transfers the toner image borne on the photosensitive drum onto the sheet. The developing unit causes the negatively charged toner from a developing cylinder to adhere to the electrostatic latent image formed on the surface of the photosensitive drum, to visualize the electrostatic latent image. The transfer unit performs a primary transfer and a secondary transfer. In the primary transfer, the transfer unit applies a positive potential to a primary transfer roller to transfer the toner image on the surface of the photosensitive drum onto a transfer belt. In the secondary transfer, the transfer unit applies a positive potential to a secondary transfer counter roller to transfer the toner image on the transfer belt onto a sheet. The fixing unit 212 is a device for melting and fixing the toner image onto the sheet by applying heat and pressure thereto, and the fixing unit 212 includes a heater, a fixing belt, and a pressure belt, which are not illustrated. The sheet feeding unit 213 is a device for feeding a sheet used for print processing. The sheet feeding unit 213 performs sheet feeding and conveyance operations using rollers and various kinds of sensors (not illustrated).

Next, an internal configuration of the stacker 108 of the image forming apparatus 101 will be described. The stacker 108 includes a communication OF unit 261, a CPU 262, a memory 263, and a sheet discharge control unit 264, which are connected via a system bus 260. The communication I/F unit 261 is connected with the print module 107 via the communication cable 251 to perform communication to control sheet accumulation and sheet discharge. The CPU 262 integrally controls the entire stacker 108 based on a control program stored in the memory 263. The memory 263 is a storage device storing the control program. The sheet discharge control unit 264 performs control to convey the conveyed sheet to a stack tray, an escape tray, or the subsequent finisher 109, based on an instruction from the CPU 262.

Next, an internal configuration of the finisher 109 of the image forming apparatus 101 will be described. The finisher 109 includes a communication OF unit 271, a CPU 272, a memory 273, a sheet discharge control unit 274, and a finishing processing unit 275, which are connected via a system bus 270.

The communication OF unit 271 is connected with the print module 107 via the communication cable 251 to perform communication to control finishing processing. The CPU 272 controls the entire finisher 109 based on a control program stored in the memory 273. The memory 273 is a storage device storing the control program. The sheet discharge control unit 274 controls the conveyance of a sheet and the discharge of the sheet based on an instruction from the CPU 272. The finishing processing unit 275 performs processing such as stapling processing, punching processing, and saddle stitching processing, based on an instruction from the CPU 272.

Next, an internal configuration of the print control apparatus 102 will be described. The print control apparatus 102 includes a power supply switch unit 240, a power supply relay unit 241, and an alternate-current/direct-current (AC/DC) power supply unit 242, which relate to the power supply. An internal module 230 of the print control apparatus 102 includes a CPU 231, a memory 232, a HDD 233, an input/output (I/O) device 234, a display 235, an external OF unit 236, a LAN I/F unit 237, a LAN OF unit 238, and a power supply control unit 239. The components are connected with each other via a system bus 220. The power supply switch unit 240 includes a power switch to instruct whether to turn on or off power supply from an AC power source. The power switch is, for example, a solenoid switch.

Further, the power supply switch unit 240 has a function of notifying the power supply control unit 239 of an ON/OFF state of the power switch. The power supply relay unit 241 can supply AC power from outside to the AC/DC power supply unit 242 even if the power switch is OFF, based on a signal from the power supply control unit 239. The AC/DC power supply unit 242 converts AC power supplied from outside the apparatus into DC power, and supplies the DC power to the internal module 230. The CPU 231 performs processing, such as PDL data reception processing, raster image processing (RIP), and transmission processing of transmitting a print job to the image forming apparatus 101, based on the programs and data stored in the HDD 233.

The memory 232 stores programs and data for the CPU 231 to perform various kinds of processing, and the memory 232 operates as a work area. The HDD 233 stores programs and data for operations, such as a PDL analysis and the RIP. The I/O device 234 is an input device for a user to input various operations and instructions to the print control apparatus 102. The I/O device 234 is, for example, a mouse or a keyboard. On the display 235, information about an application being executed by the print control apparatus 102, or the like, is displayed in the form of a still image or a moving image. The external OF unit 236 is connected with the image forming apparatus 101 via the video cable 106 to transmit and receive the image data to/from the image forming apparatus 101 as described above. Further, the video cable 106 includes signal lines used for indicating the power supply statuses of the image forming apparatus 101 and the print control apparatus 102 as described above.

The LAN OF unit 237 is connected with the LAN I/F 203 of the image forming apparatus 101 via the internal LAN 105, and transmits print jobs and various status notifications to the image forming apparatus 101 via the internal LAN 105. The internal LAN 105 has a function called "Wake on LAN" to power on the print control apparatus 102 by transmitting a magic packet from the image forming apparatus 101 to the print control apparatus 102. Further, the image forming apparatus 101 may be configured to power off the print control apparatus 102. The protocols used to turn on or off the power are not particularly limited. Further, a case where the print control apparatus 102 is powered off alone will be described below. The LAN OF unit 238 is communicable with the PC 103 via the external LAN 104.

FIG. 3 is a schematic diagram illustrating communication between the image forming apparatus 101 and the print control apparatus 102 via the video cable 106. The external OF unit 236 side includes an external OF connector 301 serving as a transmission side (TX) output port, and the video OF 202 side includes a video OF connector 302 serving as a reception side (RX) input port.

A data bus 303 is a data bus through which CMYK image data (image information) is transmitted from the external OF connector 301 to the video OF connector 302. Further, a clock (CLK) signal 304 serving as a video synchronization clock is transmitted from the external OF connector 301 to the video OF connector 302 via the data bus 303.

Further, a CREADY signal 305, which is a signal corresponding to the power supply status of the print control apparatus 102, is transmitted from the external OF connector 301 to the video OF connector 302. A PREADY signal 306, which is a signal corresponding to the power supply status of the image forming apparatus 101, is transmitted from the video OF connector 302 to the external OF connector 301.

The image forming apparatus 101 sets the level of the PREADY signal 306 to High (PREADY ON) when power of the image forming apparatus 101 is turned on, and sets the level of the PREADY signal 306 to Low (PREADY OFF) when the power of the image forming apparatus 101 is turned off. In this way, the level of the PREADY signal 306 is High when the power of the image forming apparatus 101 is ON, and is Low when the power of the image forming apparatus 101 is OFF. However, in a case where the image forming apparatus 101 receives a shut-down notification from the print control apparatus 102 (i.e., power of the print control apparatus 102 becomes OFF), the PREADY signal 306 becomes OFF. In more detail, the PREADY signal 306 indicates at least whether a function of a predetermined configuration can be used. More specifically, for example, the PREADY signal 306 indicates whether data transmission and reception via the video OF 202 are possible or not.

The print control apparatus 102 sets the level of the CREADY signal 305 to High (CREADY ON) when the power of the print control apparatus 102 is turned on, and sets the level of the CREADY signal 305 to Low when the power of the print control apparatus 102 is turned off. The image forming apparatus 101 performs polling on the CREADY signal 305 and checks whether the level of the CREADY signal 305 is High or Low to detect the power supply status of the print control apparatus 102.

The print control apparatus 102 performs polling on the PREADY signal 306 and checks whether the level of the PREADY signal 306 is High or Low to detect the power supply status of the image forming apparatus 101.

The PREADY signal 306 can transmit a signal to the power supply control unit 239 via the external OF unit 236. The power supply control unit 239 can turn on the power of the print control apparatus 102 upon receiving the High level of the PREADY signal 306. That is, when the power of the image forming apparatus 101 is turned on, the power of the print control apparatus 102 is also turned on in conjunction therewith. Accordingly, time and labor of a user to turn on the power is turned on is reduced.

The PREADY signal 306 is involved in the power supply of the print control apparatus 102 only to turn on the power in response to the PREADY ON, and the power of the print control apparatus 102 is not turned off only by detecting the PREADY signal 306 to be OFF.

Figure 11A:
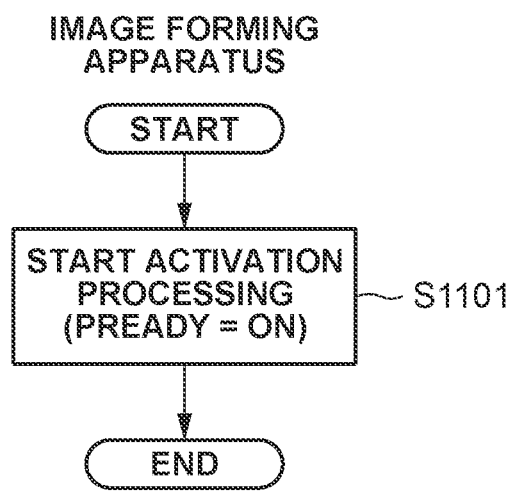
FIGS. 11A and 11B are flowcharts illustrating activation operations of the image forming apparatus and the print control apparatus according to the first exemplary embodiment.
Figure 11B:
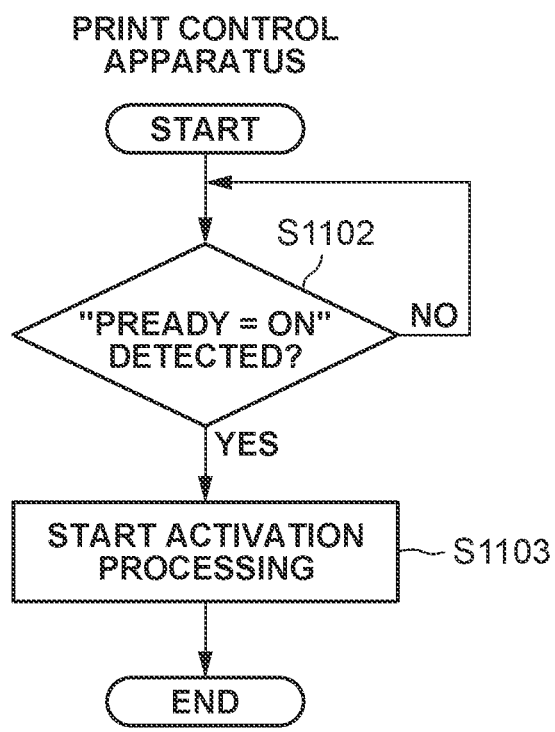

FIGS. 11A and 11B are flowcharts illustrating activation operations of the image forming apparatus 101 and the print control apparatus 102 according to the first exemplary embodiment.

FIG. 11A is a flowchart illustrating an activation operation of the image forming apparatus 101. The processing in the flowchart in FIG. 11A is implemented by the CPU 205 executing a program stored in the HDD 204. In addition, the processing in the flowchart in FIG. 11A is started when the image forming apparatus 101 receives an activation instruction from a user.

In step S1101, the image forming apparatus 101 starts activation processing. At this time, the activation processing includes, for example, activation of the CPU 205 and the HDD 204, lighting of the display 208, and starting preparation of components involved in the printing, such as the fixing unit 212. Upon starting the activation processing, the PREADY signal 306 becomes ON. When the processing in step S1101 is completed, the activation of the image forming apparatus 101 is completed.

Next, an activation operation of the print control apparatus 102 will be described with reference to FIG. 11B. In step S1102, when the power supply control unit 239 of the print control apparatus 102 detects that the PREADY signal is ON (YES in step S1102), the CPU 231 is activated, and the processing proceeds to step S1103. In step S1103, the print control apparatus 102 performs activation processing. The activation processing is performed by the CPU 231 executing a program stored in the HDD 233.

In the present exemplary embodiment, as illustrated in FIGS. 11A and 11B, the image forming apparatus 101 and the print control apparatus 102 are powered on in conjunction with each other.

Figure 4B:
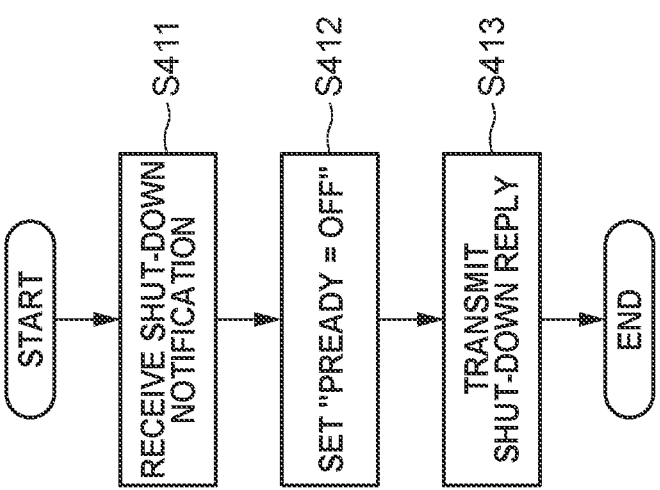
FIGS. 4A and 4B are flowcharts illustrating a shut-down operation of the print control apparatus according to the first exemplary embodiment.
Figure 4A:
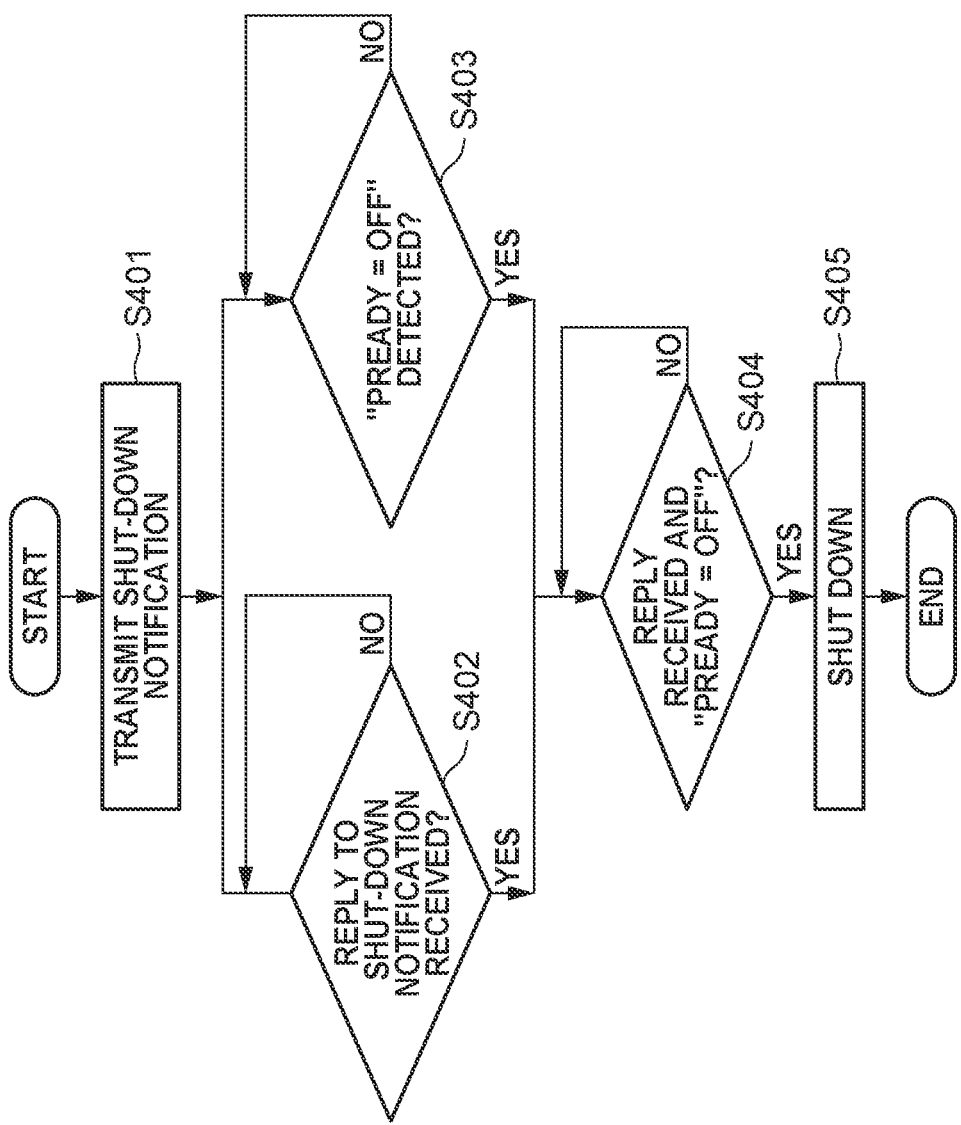

FIGS. 4A and 4B are flowcharts relating to a shut-down operation of the print control apparatus 102 according to the present exemplary embodiment.

FIG. 4A is a flowchart illustrating processing performed by the print control apparatus 102. The processing in the flowchart illustrated in FIG. 4A is performed by the CPU 231 executing a program stored in the HDD 233.

The processing performed by the print control apparatus 102 illustrated in the flowchart is started when the print control apparatus 102 receives a shut-down instruction provided by a user using the I/O device 234 or the like. The shut-down instruction may be provided by a user pressing the power supply switch unit 240, or may be received from the PC 103 via the external LAN 104.

In step S401, the print control apparatus 102 transmits a shut-down notification to the CPU 205 of the image forming apparatus 101 via the LAN OF unit 237, the internal LAN 105, and the LAN OF 203. After completing the processing in step S401, the processing proceeds to steps S402 and S403. The processing in step S402 and the processing in step S403 are performed in parallel using different threads of the CPU 231. The parallel processing is just an example, and it is not limited thereto. In step S402, the print control apparatus 102 determines whether a reply to the notification transmitted in step S401 is returned from the image forming apparatus 101. At this time, the print control apparatus 102 receives the reply via the internal LAN 105. In a case where the print control apparatus 102 receives the reply (YES in step S402), the processing proceeds to step S404.

In step S403, the print control apparatus 102 determines whether the PREADY signal is Low (i.e., PREADY signal is OFF). In a case where the PREADY signal is Low (YES in step S403), the processing proceeds to step S404. In step S404, the print control apparatus 102 determines both whether the print control apparatus 102 receives the reply in step S402 and whether the PREADY signal is Low (PREADY OFF) in step S403. In step S404, if the print control apparatus 102 satisfies both of the conditions (YES in step S404), the processing proceeds to step S405. In step S405, the print control apparatus 102 performs shut-down processing. The power supply control unit 239 and the external OF unit 236 in the print control apparatus 102 are kept being powered on after the shut-down. Accordingly, as described above with reference to FIG. 10, the PREADY signal becomes ON so that the print control apparatus 102 becomes activated.

In step S404 in the present exemplary embodiment, the print control apparatus 102 determines whether both of the threads have ended using the threads that are to end when the threads pass through the processing in steps S402 and in S403.

This is just an example, and any other method can be used only if it is possible to determine whether both of the conditions in steps S402 and S403 are satisfied. For example, a method of setting a flag when each of the conditions in steps S402 and S403 is satisfied, and determining whether both of the flags are set may be used.

Next, FIG. 4B is a flowchart illustrating processing performed by the image forming apparatus 101. The processing in the flowchart in FIG. 4B is started by the CPU 205 executing a program stored in the HDD 204.

In step S411, the image forming apparatus 101 receives the shut-down notification in step S401, and the processing proceeds to step S412. In step S412, the image forming apparatus 101 sets the PREADY signal to Low (PREADY OFF). In step S413, the image forming apparatus 101 transmits a shut-down reply notification to the print control apparatus 102 indicating that the print control apparatus 102 is allowed to be shut down. After completing the processing in step S413, the image forming apparatus 101 ends the processing in the flowchart. The image forming apparatus 101 is not shut down and can be used. In order to shut down the image forming apparatus 101, shut-down processing for the image forming apparatus 101 needs to be performed.

As described above, the configuration in which the print control apparatus 102 is shut down after the PREADY signal becomes OFF makes it possible to prevent the print control apparatus 102 from reactivating in response to the reception of the PREADY signal ON after the print control apparatus 102 is shut down. Further, it is possible to prevent an unintentional shut-down due to a temporary switchover between High and Low of the signal of the video signal line caused by a cable drop out or an influence of noise. Thus, it is possible to appropriately control to power off the print control apparatus 102 that is turned on in conjunction with the power ON of the image forming apparatus 101.

Next, a second exemplary embodiment of the present disclosure will be described. The configuration described in the second exemplary embodiment is intended to surely start the shut-down of the print control apparatus 102 within a predetermined period of time.

FIG. 5 is a hardware block diagram illustrating the configurations of the image forming apparatus 101 and the print control apparatus 102 according to the second exemplary embodiment. In the present exemplary embodiment, a configuration different from that illustrated in FIG. 2 will be described.

The second exemplary embodiment is different from the first exemplary embodiment in that an interlocking relay unit 501 is added between the external OF unit 236 and the power supply control unit 239. The power supply control unit 239 switches the ON and OFF of the interlocking relay unit 501 to switch whether the PREADY signal from the video OF 202 is transmitted to the power supply control unit 239. In this way, it is possible to switch whether to use the PREADY signal to power on the print control apparatus 102.

Figure 6:
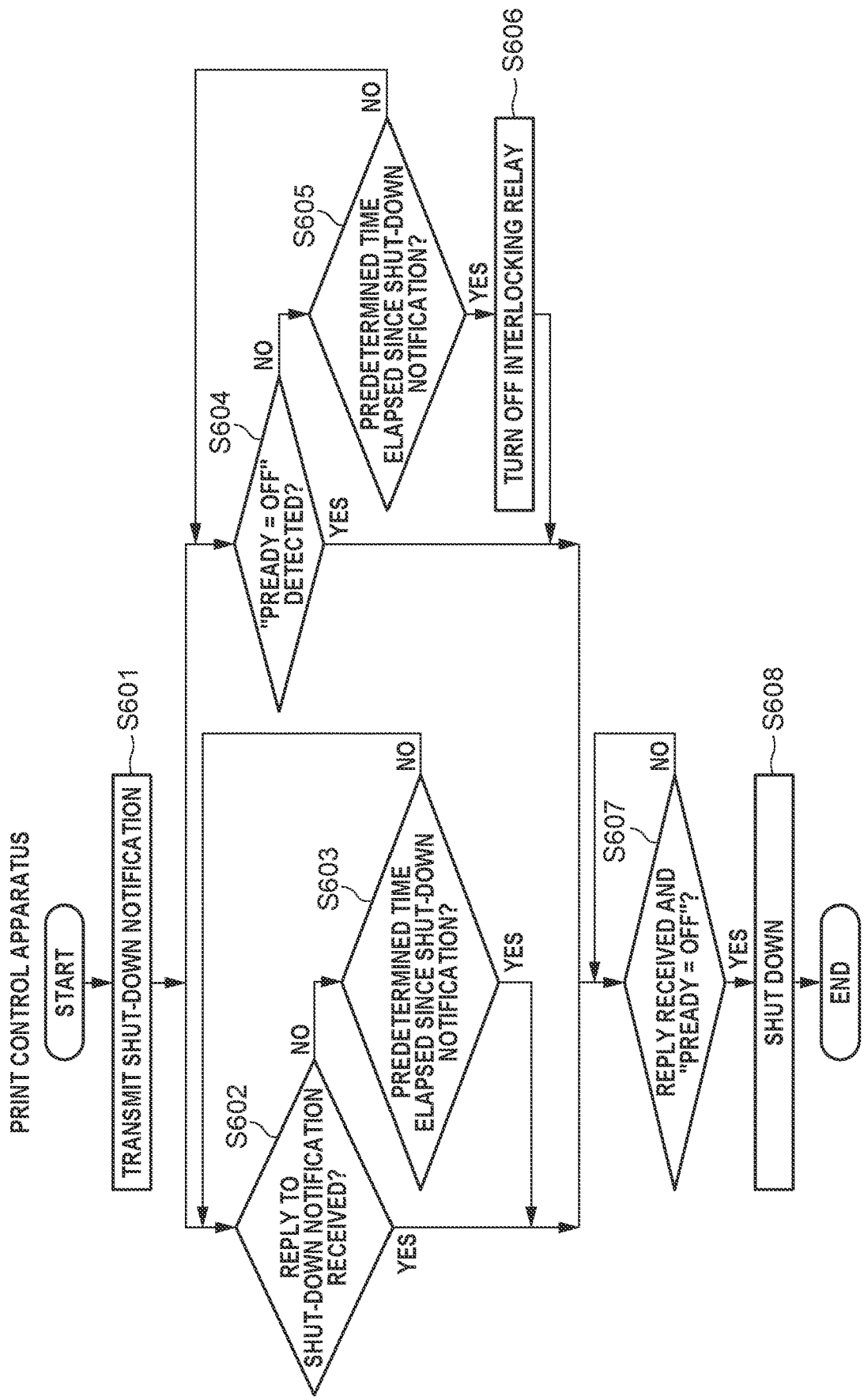
FIG. 6 is a flowchart illustrating a shut-down operation of the print control apparatus according to the second exemplary embodiment.

FIG. 6 is a flowchart illustrating a shut-down operation of the print control apparatus 102 according to the second exemplary embodiment. Similar to the first exemplary embodiment, the processing in the flowchart is implemented by the CPU 231. The flowchart of the processing performed by the image forming apparatus 101 is similar to that in the first exemplary embodiment, and thus the description thereof is omitted.

Processing performed in step S601 is similar to that in step S401, and thus the description thereof is omitted. Processing in steps S602 to S603 and processing in steps S604 to S606 are performed in parallel using different threads of the CPU 231.

In step S602, similar in step S402, the print control apparatus 102 waits for receiving the reply to the shut-down notification via the internal LAN 105. In step S602, when the print control apparatus 102 has not received the reply (NO in step S602), the processing proceeds to step S603. In step S603, the print control apparatus 102 determines whether a predetermined time has elapsed since the shut-down notification transmitted in step S601. The predetermined time is determined in advance in a program stored in the HDD 233 (e.g., 1 minute). If the print control apparatus 102 determines that the predetermined time has not elapsed (NO in step S603), the processing returns to step S602, and the print control apparatus 102 waits for receiving the shut-down notification. In step S603, if the print control apparatus 102 determines that the predetermined time has elapsed (YES in step S603), the thread is ended, and the processing proceeds to step S607. In this case, in step S607 to be described below, the print control apparatus 102 determines to have received the reply even though it is not received.

In step S604, the print control apparatus 102 determines whether the PREADY OFF is detected (i.e., the print control apparatus 102 determines whether the PREADY signal is Low), similar in step S403. If the print control apparatus 102 does not detect the PREADY OFF (NO in step S604), the processing proceeds to step S605. In step S605, the print control apparatus 102 determines whether a predetermined time has elapsed from the shut-down notification transmitted in step S601. The predetermined time is determined in advance in a program stored in the HDD 233 (e.g., 1 minute). In step S605, if the print control apparatus 102 determines that the predetermined time has not elapsed (NO in step S605), the processing returns to step S604, and the print control apparatus 102 determines whether the PREADY OFF is detected. In step S605, if the print control apparatus 102 determines that the predetermined time has elapsed (YES in step S605), the processing proceeds to step S606.

In step S606, the print control apparatus 102 instructs the power supply control unit 239 to turn off the interlocking relay unit 501. The power supply control unit 239 turns off a relay switch included in the interlocking relay unit 501. In this way, the print control apparatus 102 determines that the PREADY signal is OFF based on the OFF state of the relay switch. More specifically, since the signal input to the power supply control unit 239 becomes a signal corresponding to Low, the PREADY signal is determined to be Low. Accordingly, even if the print control apparatus 102 does not detect the PREADY signal OFF in step S604, when the predetermined time has elapsed in step S605, the state of the print control apparatus 102 becomes the same as that when the print control apparatus 102 detects the PREADY OFF (YES in step S604). The thread is ended, and then the processing proceeds to step S607.

In step S607, the print control apparatus 102 determines whether both of the thread for steps S602 and S603 and the thread for steps S604 to S606 are ended. When both of the threads are ended (YES in step S607), the processing proceeds to step S608. In step S608, the print control apparatus 102 is shut down. Further, similar to the first exemplary embodiment, the processing using the threads is just an example, and it is not limited thereto. A method of performing the determination using flags may be employed.

As described above, even if the shut-down processing of the image forming apparatus 101 is not performed normally, it is possible to shut down the print control apparatus 102 after the elapse of the predetermined time. That is, it is possible to appropriately control to power off the print control apparatus 102 that is turned on in conjunction with the power ON of the image forming apparatus 101.

Next, a third exemplary embodiment of the present disclosure will be described.

In the second exemplary embodiment, the print control apparatus 102 performs the shut-down without determining the status of the PREADY signal. However, in this case, for example, when the image forming apparatus 101 is powered on next, the print control apparatus 102 cannot be powered on in conjunction therewith.

The third exemplary embodiment is intended to enable the power supply control unit 239 to use the status of the PREADY signal for the determination after a predetermined time has elapsed.

Figure 7:
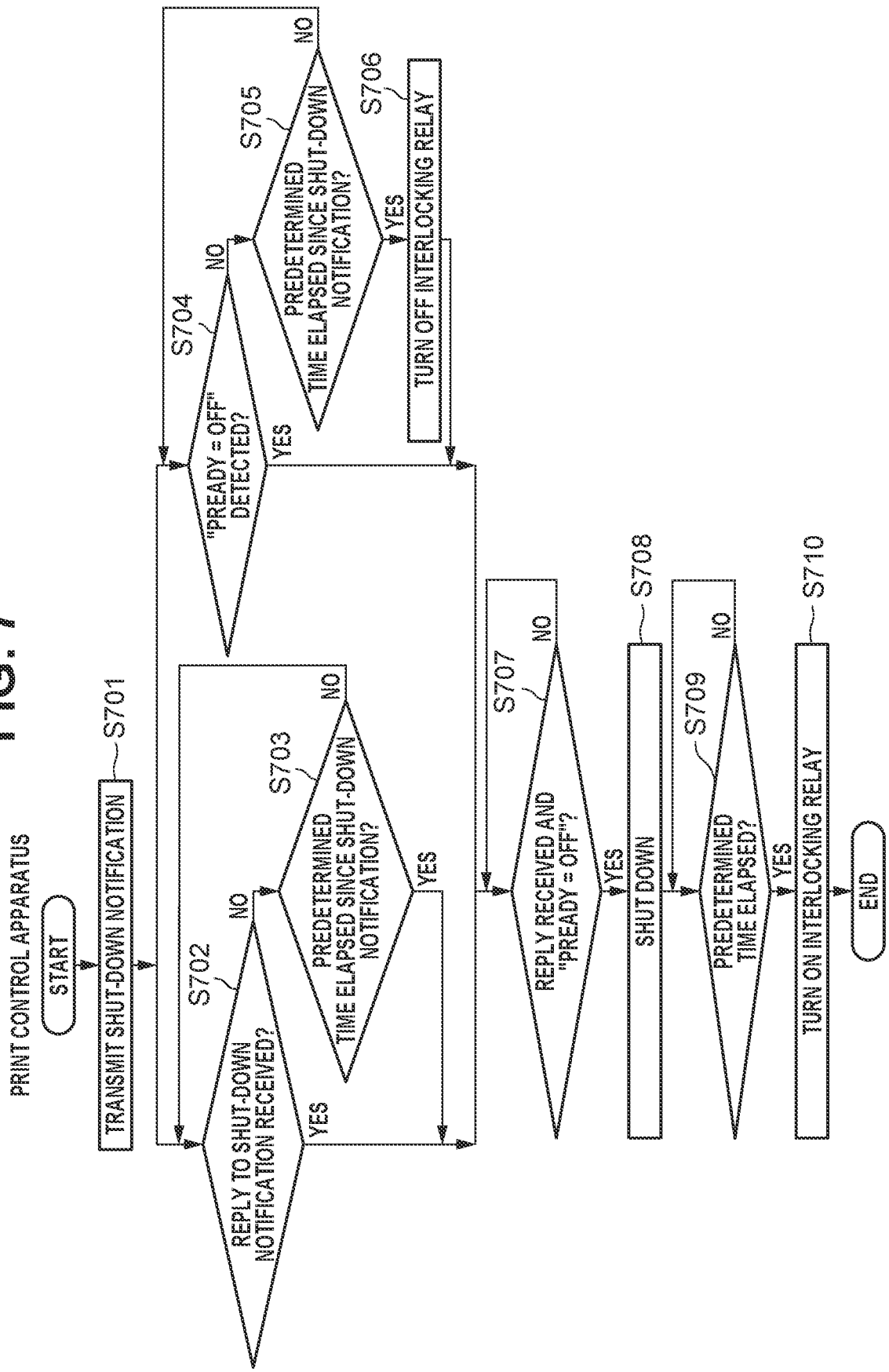
FIG. 7 is a flowchart illustrating a shut-down operation of a print control apparatus according to a third exemplary embodiment.

FIG. 7 is a flowchart illustrating a shut-down operation of the print control apparatus 102 according to the third exemplary embodiment. The flowchart of the processing performed by the image forming apparatus 101 is similar to that in the first exemplary embodiment, and thus the description thereof is omitted.

Similar to the first exemplary embodiment, processing in steps S701 to S708 is implemented by the CPU 231. In steps S709 and S710, the power supply control unit 239 keeps receiving power after the shut-down, and the processing in steps S709 and S710 is performed by the power supply control unit 239 without using the CPU 231. The processing in steps S701 to S708 is similar to that in steps S601 to S608, and thus the description thereof is omitted. In step S709, the print control apparatus 102 determines whether a predetermined time has elapsed since the shut-down of the print control apparatus 102. The predetermined time may be determined in advance, or may be variable. In step S709, when the print control apparatus 102 determines that the predetermined time has elapsed (YES in step S709), the processing proceeds to step S710. In step S710, the print control apparatus 102 turns on the interlocking relay unit 501. Further, the interlocking relay unit 501 may be provided with a timer function, and may bring the interlocking relay unit 501 back to ON when a predetermined time has elapsed.

As described above, it is possible for the print control apparatus 102 to detect the PREADY signal ON after the predetermined time. In this way, it is possible to surely power off the print control apparatus 102, for example, when the use of the print control apparatus 102 is finished at the closing time, and to power on the print control apparatus 102 in conjunction with the activation of the image forming apparatus 101 when the image forming apparatus 101 is powered on the next day.

A fourth exemplary embodiment is intended to make the power supply interlocking between the image forming apparatus 101 and the print control apparatus 102 settable by a user, in addition to the configuration of the first exemplary embodiment.

Figure 8:
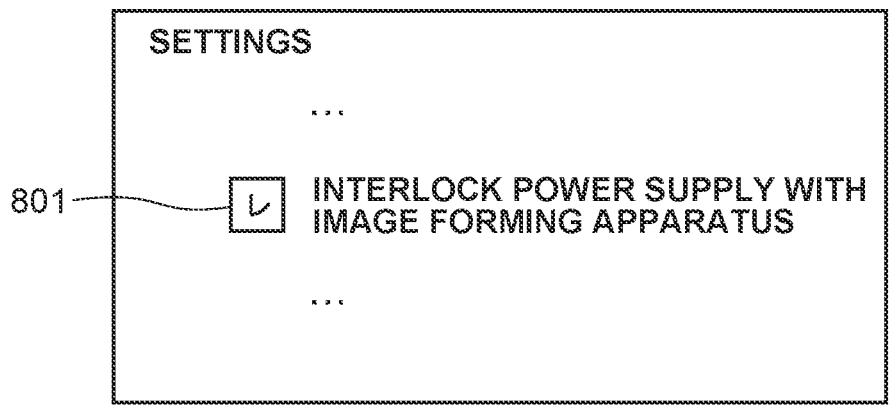
FIG. 8 is a diagram illustrating an example of a setting screen of a print control apparatus according to a fourth exemplary embodiment.

FIG. 8 is an example of a setting screen relating to the power supply interlocking settable by the print control apparatus 102. The setting screen is displayed by the CPU 231 on the display 235 according to a program stored in the HDD 233.

Enabling and disabling of the power supply interlocking can be set based on the input from the I/O device 234. The setting value is stored in the HDD 233.

When a check box for the power supply interlocking setting 801 is checked (i.e., the power supply interlocking setting is ON), the interlocking relay unit 501 becomes ON. Accordingly, as described with reference to FIGS. 11A and 11B, the print control apparatus 102 is activated in conjunction with the activation of the image forming apparatus 101. Then, as described with reference to FIGS. 4A and 4B, the print control apparatus 102 is shut down without shutting down the image forming apparatus 101, upon receiving a shut-down instruction. On the other hand, when the check box for the power supply interlocking setting 801 is not checked (i.e., the power supply interlocking setting is OFF), the interlocking relay unit 501 is constantly OFF.

However, with this setting, the PREADY signal indicating being constantly OFF is transmitted to the print control apparatus 102. Accordingly, the print control apparatus 102 is not activated in conjunction with the activation of the image forming apparatus 101. However, in a case where the print control apparatus 102 receives the shut-down instruction, the print control apparatus 102 is shut down without shutting down the image forming apparatus 101, regardless of the presence or absence of the check mark in the check box for the power supply interlocking setting 801. In addition, the configuration in FIG. 8 can be applied to the second exemplary embodiment.

As described above, the power supply interlocking between the image forming apparatus 101 and the print control apparatus 102 can be settable.

In the fourth exemplary embodiment, setting the power supply interlocking to ON to turn on the print control apparatus 102 in conjunction with the image forming apparatus 101 is described. In a fifth exemplary embodiment, an embodiment in which a user determines whether to perform the power supply interlocking at a time of shut-down will be described.

Figure 9:
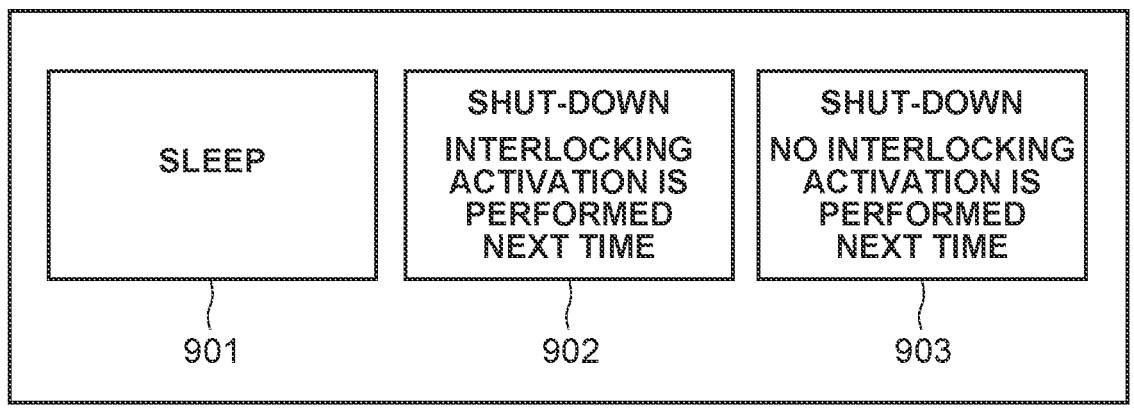
FIG. 9 is a diagram illustrating an example of a power off instruction screen of a print control apparatus according to a fifth exemplary embodiment.

FIG. 9 illustrates an example of a shut-down screen of the print control apparatus 102. The setting screen is displayed on the display 235 by the CPU 231 according to a program stored in the HDD 233. Any of the options on the shut-down screen can be selected depending on the input from the I/O device 234.

A sleep button 901 is a button for bringing the print control apparatus 102 into a sleep state. A shut-down button 902 is a shut-down button for causing the print control apparatus 102 to be powered off and then causing the print control apparatus 102 to be powered on in conjunction with the power-ON of the image forming apparatus 101. A shut-down button 903 is a shut-down button for causing the print control apparatus 102 to be powered off and then causing the print control apparatus 102 not to be powered on in conjunction with the power-ON of the image forming apparatus 101.

Figure 10:
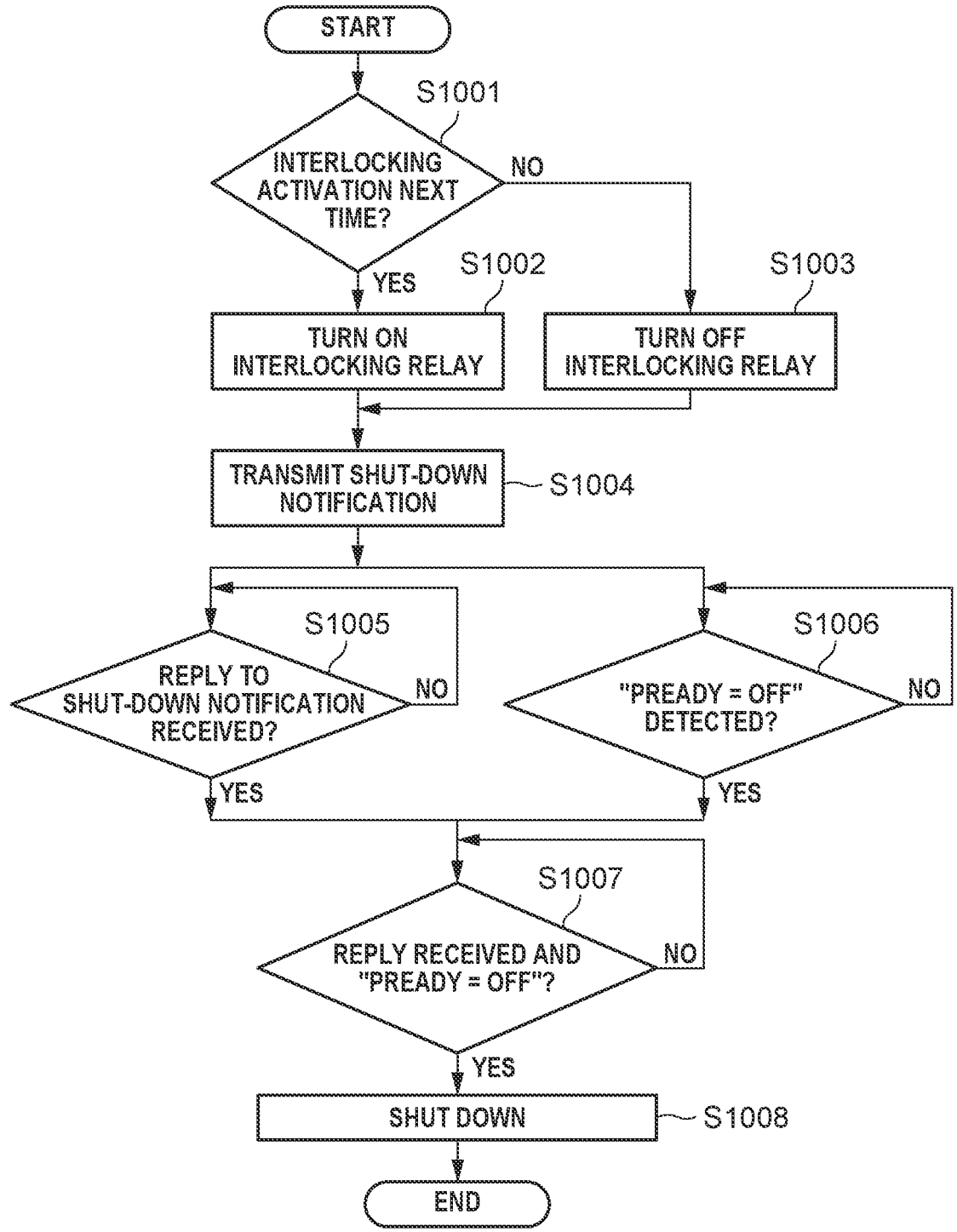
FIG. 10 is a flowchart illustrating a shut-down operation of the print control apparatus according to the fifth exemplary embodiment.

The block diagram of the print control apparatus 102 in the fifth exemplary embodiment is the same as that in FIG. 5. FIG. 10 is a flowchart illustrating a shut-down operation of the print control apparatus 102 according to the fifth exemplary embodiment. Processing in the flowchart for the print control apparatus 102 is implemented by the CPU 231 executing a program stored in the HDD 233. The flowchart of the processing performed by the image forming apparatus 101 is similar to that in the first exemplary embodiment, and thus the description thereof is omitted.

In step S1001, the print control apparatus 102 determines whether to perform the power supply interlocking at the next activation. More specifically, in a case where the print control apparatus 102 determines that the shut-down button 902 is pressed (YES in step S1001), the processing proceeds to step S1002. In a case where the shut-down button 903 is pressed (NO in step S1001), the processing proceeds to step S1003. In step S1002, the print control apparatus 102 turns on the interlocking relay unit 501 via the power supply control unit 239. In step S1003, the print control apparatus 102 turns OFF the interlocking relay unit 501 via the power supply control unit 239. Processing performed in steps S1004 to S1008 is similar to that performed in steps S401 to S405, and thus the description thereof is omitted. In step S1006, the PREADY signal is constantly OFF because the interlocking relay unit 501 is OFF.

As described above, the use is allowed to determine whether to perform the power supply interlocking at the shut-down so that it is possible for the user to determine whether to power on the print control apparatus 102 in conjunction with the power on of the image forming apparatus 101 at each time when the print control apparatus 102 is shut down.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-093564, which was filed on Jun. 9, 2022 and which is hereby incorporated by reference herein in its entirety.

What is claimed is:

1. A print control apparatus communicable with an image forming apparatus and configured to be activated based on activation of the image forming apparatus, the print control apparatus comprising:
one or more computer-readable storage media; and
one or more processors, wherein the one or more processors and the one or more computer-readable storage media are configured to:
receive a shut-down instruction;
receive a signal from the image forming apparatus;
transmit a shut-down notification to the image forming apparatus, and receive a reply to the shut-down notification from the image forming apparatus; and
perform, in a case where the shut-down instruction is received, shut-down processing of the print control apparatus after receiving a predetermined signal as the signal from the image forming apparatus that is not shut down even after the print control apparatus is shut down and receiving the reply to the shut-down notification.

2. The print control apparatus according to claim 1, wherein the predetermined signal is a signal indicating that a predetermined configuration of the image forming apparatus is not usable.

3. The print control apparatus according to claim 2, further comprising:
a video interface (IF); and
a network interface (IF),
wherein the signal is received from the image forming apparatus via the video IF,
wherein the shut-down notification is transmitted from the image forming apparatus via the network IF, and
wherein the reply is received from the image forming apparatus via the network IF.

4. The print control apparatus according to claim 3, wherein the predetermined configuration is the video IF.

5. The print control apparatus according to claim 1, wherein the one or more processors and the one or more computer-readable storage media are further configured to, at a time of the activation of the image forming apparatus, activate the print control apparatus in a case where a signal different from the predetermined signal is received from the image forming apparatus.

6. The print control apparatus according to claim 1, wherein the one or more processors and the one or more computer-readable storage media are further configured to determine whether a condition for performing the shut-down processing of the print control apparatus is satisfied,
wherein the condition is determined to be satisfied after the predetermined signal indicates OFF, and the reply to the shut-down notification has been received.

7. The print control apparatus according to claim 6, wherein the one or more processors and the one or more computer-readable storage media are further configured to perform the shut-down processing of the print control apparatus based on receiving the predetermined signal even if the reply has not been received, in a case where the reply to the shut-down notification has not been received within a predetermined time that has elapsed from when the shut-down notification is transmitted to the image forming apparatus.

8. The print control apparatus according to claim 1, further comprising a switching unit configured to switch the signal received from the image forming apparatus,
wherein the switching unit switches the signal to a signal indicating OFF when a predetermined time has elapsed from when the shut-down instruction is received.

9. The print control apparatus according to claim 8, wherein the switching unit switches the signal back to a state before switching the signal to the signal indicating OFF when a predetermined time has elapsed from when the shut-down processing is performed.

10. The print control apparatus according to claim 1, further comprising an interlocking setting for interlocking power states of the image forming apparatus and the print control apparatus,
wherein in a case where the interlocking setting is enabled and where the shut-down instruction has been received, the one or more processors and the one or more computer-readable storage media are further configured to perform the shut-down processing of the print control apparatus after receiving the predetermined signal from the image forming apparatus and receiving the reply to the shut-down notification.

11. The print control apparatus according to claim 1, wherein the one or more processors and the one or more computer-readable storage media are further configured to receive one setting of a plurality of settings including a first setting to activate the print control apparatus based on activation of the image forming apparatus and a second setting not to activate the print control apparatus based on activation of the image forming apparatus.

12. The print control apparatus according to claim 11, wherein in a case where the second setting is set, the print control apparatus is not shut down based on shutdown of the image forming apparatus.

13. The print control apparatus according to claim 1, wherein in a case where the image forming apparatus receives the shut-down instruction from a user, the print control apparatus is not shut down.

14. The print control apparatus according to claim 1, wherein the print control apparatus determines that a condition for performing the shut-down processing is satisfied after the predetermined signal indicates OFF and the reply is received, and performs the shut-down processing of the print control apparatus.

15. The print control apparatus according to claim 14, wherein the print control apparatus performs the shutdown-processing of the print control apparatus based on receiving the predetermined signal even if the reply has not been received, in a case where the reply is not received when a predetermined time has elapsed from when the shut-down notification is transmitted to the image forming apparatus.

16. A print control system comprising:
an image forming apparatus; and
a print control apparatus communicable with the image forming apparatus, the print control apparatus being activated when the image forming apparatus is activated,
wherein in a case where the print control apparatus receives a shut-down instruction, the print control apparatus transmits a shut-down notification to the image forming apparatus,
wherein the image forming apparatus transmits a reply to the shut-down notification to the print control apparatus, and transmits a signal to the print control apparatus,
wherein the print control apparatus performs shut-down processing of the print control apparatus after receiving a predetermined signal as the signal and the reply from the image forming apparatus that is not shut down based on the shut-down instruction, and
wherein the image forming apparatus maintains an ON state of the image forming apparatus even after the print control apparatus is shut down.

17. The print control system according to claim 16, wherein after the image forming apparatus transmits the reply to the print control apparatus and transmits the signal to the print control apparatus, a shut-down of the image forming apparatus is not performed, and the image forming apparatus is in a usable state.

18. The print control system according to claim 17, wherein the predetermined signal is a signal indicating that a predetermined configuration of the image forming apparatus is not usable.

19. The print control system according to claim 16, wherein, when the image forming apparatus is activated, the print control apparatus is activated in a case where the print control apparatus receives from the image forming apparatus a signal different from the predetermined signal.

20. The print control system according to claim 16, wherein in a case where an interlocking setting for interlocking states of the image forming apparatus and the print control apparatus is enabled, and in a case where the shut-down instruction is received, the print control apparatus performs shut-down processing of the print control apparatus after receiving the predetermined signal and the reply.

21. A control method for a print control apparatus communicable with an image forming apparatus and configured to be activated based on an activation of the image forming apparatus, the method comprising:
   receiving a shut-down instruction;
   receiving a signal from the image forming apparatus;
   transmitting a shut-down notification to the image forming apparatus and receiving a reply to the shut-down notification from the image forming apparatus; and
   performing in a case where the shut-down instruction is received, shut-down processing of the print control apparatus after receiving a predetermined signal as the signal and receiving the reply from the image forming apparatus that is not shut-down even after the print control apparatus is shut down.

* * * * *